US012528722B2

(12) United States Patent
Utsunomiya

(10) Patent No.: US 12,528,722 B2
(45) Date of Patent: Jan. 20, 2026

(54) COMPRESSED AIR JET DEVICE

(71) Applicant: UTSUNOMIYA KOGYO CO., LTD., Tokyo (JP)

(72) Inventor: Hideo Utsunomiya, Tokyo (JP)

(73) Assignee: UTSUNOMIYA KOGYO CO., LTD., Tokyo (JP)

( * ) Notice: Subject to any disclaimer, the term of this patent is extended or adjusted under 35 U.S.C. 154(b) by 497 days.

(21) Appl. No.: 18/028,427

(22) PCT Filed: Jul. 9, 2021

(86) PCT No.: PCT/JP2021/025908
§ 371 (c)(1),
(2) Date: Mar. 24, 2023

(87) PCT Pub. No.: WO2022/070545
PCT Pub. Date: Apr. 7, 2022

(65) Prior Publication Data
US 2023/0331589 A1  Oct. 19, 2023

(30) Foreign Application Priority Data

Sep. 30, 2020 (JP) ................................. 2020-164408

(51) Int. Cl.
*C02F 1/40* (2023.01)
*B01D 21/24* (2006.01)
*E03F 5/14* (2006.01)

(52) U.S. Cl.
CPC ............ *C02F 1/40* (2013.01); *B01D 21/2433* (2013.01); *E03F 5/14* (2013.01)

(58) Field of Classification Search
CPC .......... C02F 1/40; C02F 3/20; B01D 21/2433; E03F 5/14; B03D 1/242; F16L 41/10
(Continued)

(56) References Cited

U.S. PATENT DOCUMENTS 2,267,608 A  12/1941 Hawley
3,762,169 A  10/1973 Graham
2012/0159700 A1  6/2012 Iacampo

FOREIGN PATENT DOCUMENTS

EP  2213624 A1  8/2010
JP  S58-040167 A  3/1983
(Continued)

OTHER PUBLICATIONS

International Search Report and Written Opinion dated Sep. 7, 2021, issued by the International Searching Authority in International Patent Application No. PCT/JP2021/025908.
(Continued)

*Primary Examiner* — Ekandra S. Miller-Cruz
(74) *Attorney, Agent, or Firm* — ArentFox Schiff LLP

(57) ABSTRACT

Provided is a compressed air jet device A composed of an discharge port member 1 provided on a pipe P for connecting to a compressed air supply source such that the opening thereof faces downwards, and a hole portion 14 provided in the connection 10 between the pipe P and the discharge port member 1 and allowing communication between the interior of the pipe P and the interior of the discharge port member 1, wherein the vertical cross-sectional shape of the peripheral wall 2 of the discharge port member is formed so that the interior side and/or the exterior side of the discharge port member are inclined to have a smaller wall thickness towards the free end of the opening 1a.

8 Claims, 3 Drawing Sheets

(58) Field of Classification Search
USPC .................................................. 210/221.1
See application file for complete search history.

(56) References Cited

FOREIGN PATENT DOCUMENTS

| | | | |
|---|---|---|---|
| JP | 2004-148186 | A | 5/2004 |
| JP | 3943551 | B2 | 7/2007 |
| JP | 2011-088048 | A | 5/2011 |
| JP | 5443122 | B2 | 3/2014 |

OTHER PUBLICATIONS

Extended European Search Report, issued by the European Patent Office in corresponding European Application No. 21874849, dated Aug. 9, 2024.

COMPRESSED AIR JET DEVICE

BACKGROUND OF THE INVENTION

Technical Field

The present invention relates to a compressed air jet device, and in particular, relates to those suitable for treating sewage and wastewater, such as a sedimentation basin in a sewage treatment plant.

The present application is a National Stage entry of the International Application No. PCT/JP2021/025908, filed Jul. 9, 2021, which claims priority to Japanese Patent Application No. 2020-164408, filed Sep. 30, 2020. The disclosures of the priority applications are incorporated in their entirety by reference herein.

Background Art

The present applicant has previously suggested a scum removing device installed in a primary sedimentation basin (there is a case in which it is called as a first sedimentation basin.) of a sewage treatment plant in Patent Literature 1 (Japanese Patent Gazette No. 3943551) and also suggested a compressed air jet device (it is a "jet device for compressed air" in Patent Literature 1, and a "jet means for compressed air in Patent Literature 2) which is suitable for the scum removing device in Patent Literature 2 (Japanese Patent Gazette No. 5443122).

The scum removing device shown in the above-mentioned Patent Literature 1 has been put to practical use with a nickname of "Shu-ich Kun" (register trade mark), can reduced an outflow volume of water along the scum removal to ½0 to ⅓0 of the conventional scum removing device, and has an advantage of contributing energy saving. That is, when scum is discharged, this scum removing device has a structure in which a compressed air jet device is installed, when removing the generated scum by sinking a part of an opening of a pipe-type scum discharge mechanism (it is called as a pipe skimmer) into water to flow the scum into the opening, on a wall surface side to which the scum flows in between the surfaces forming the opening to jet the compressed air upward along the wall surface. As a result, scum can smoothly flow into the opening of the pipe skimmer, the entire scum can smoothly move, and scum discharge can be quickly performed.

A compressed air jet device shown in the above-described patent literature 2 is made for preventing unless clogging since jet holes of the compressed air are easily polluted and clogged since the pipe skimmer installed in the compressed air jet device is positioned in waste water.

In order to make understanding of the present invention easy, FIG. 3 to FIG. 6 shown in Patent Literature 2 are used. FIG. 4 and FIG. 6 are enlarged views of a part of the compressed air jet device regarding FIG. 3 and FIG. 5.

Pipe skimmer 30 installed in which a compressed air jet device 20 is installed is installed at a terminal end side of a flow direction (refer to the illustrated arrow "a") of raw water (waste water) of a primary sedimentation basin T to extend along a direction orthogonal to the flow and to be sank in water at a part. On an upper portion of the pipe skimmer 30, an opening 31 is provided along an axis direction. The pipe skimmer 30 is configured so that a part of the opening 31 can be sank in the water when it rotates around an axis by a drive device which is not shown. The compressed air jet device 20 is provided at outside the pipe skimmer 30 at a side to which the raw water flows and below the opening 31.

In the compressed air jet device 20, a bowl-shape body (a discharge port member) 21 is attached to via a connection 22 to hang down from a pipe member P made of metal. That is, the bowl-shape body 21 is installed on the pipe member P so that an opening part of the bowl-shape part faces downward.

The pipe member P extends in a longitudinal direction of the pipe skimmer 30 and connected to a compressed air source which is not illustrated via a valve. The pipe member P is fixed to the pipe skimmer 30 by a holding member 23. The inside of the bowl-shape body 21 and the inside of the pipe member P are connected through a hole part 24 provided to penetrate an axis of the connection 22 (refer to FIG. 4 and FIG. 6).

In addition, although it is not clear in the illustrated example, a plurality of the bowl-shape bodies 21 are provided when the pipe member P is viewed from the flow direction of the raw water with a predetermined interval to each other along a longitudinal direction of the pipe member P.

In the compressed air jet device 20 configured of the above-described structure, when the opening 31 of the pipe skimmer 30 is positioned above a water surface and the compressed air is not jetted out from the compressed air jet device 20, the valve (not illustrated) of the compressed air source continuing to the pipe member P is closed; accordingly, the raw water does not enter into the bowl-shape bodies 21, the hole portion 24 is not in contact with the raw water (wastewater), and the clogging can be effectively prevented (refer to FIG. 4).

On the other, when a part of the opening 31 of the pipe skimmer 30 is positioned under the water surface and the compressed air is jetted out from the compressed air jet device 20, i.e., when the scum S is discharged, the valve is opened and the compressed air from the compressed air source is discharged from the opening part of the bowl-shape body 21, and the movement of the scum S to the opening 31 of the pipe skimmer 30 is promoted (refer to FIG. 6). In addition, at this time, in order to promote the movement of the scum S to the opening 31 of the pipe skimmer 30, pressure water is jetted from a nozzle 40 toward an upper surface of the scum S (refer to FIG. 5).

CITATION LIST

Patent Literature

Patent Literature 1: Japanese Patent Gazette No. 3943551
Patent Literature 2: Japanese Patent Gazette No. 5443122

SUMMARY OF INVENTION

Technical Problem

The compressed air jet device according to the above-described patent Literature 2 has an advantage in which the hole portion provided at the connection between the inside of the pipe member and the bowl-shape bodies are not in contact with the wastewater so that the clogging can be effectively prevented since the bowl-shape bodies are provided at the pipe member continuing to the supply source of the compressed air so that the opening part faces downward; however, there is a disadvantage in which the cost is high if the bowl-shape bodies are manufactured one by one by mechanical working. Moreover, since the bowl-shape body is installed in wastewater such as sewage, the compressed air jet device in which not only dirt is not easily adhered but also easy to peel off the adhered dirt was desired. Furthermore, appearance of a compressed air jet device which can perform the jet of the compressed air more evenly was waited.

An object of a compressed air jet device according to the present invention is to provide a compressed air jet device which can be manufactured at a low cost, to which dirt is not easily adhered, in which the dirt can be easily peeled off even if it is adhered, and further, which can perform the jet of the compressed air more even.

Solution to Problem

A compressed air jet device according to the present invention is a compressed air jet device including a pipe communicated with a supply source of compressed air and an discharge port member provided on the pipe, in which the discharge port member is formed in a cup shape in which a top part thereof is connected to the pipe and an opening faces outward in a radius direction of the pipe, on a connection of the pipe and the discharge port member, a hole portion is formed to communicate an interior of the pipe and an interior of the discharge port member; and in the compressed air jet device, a vertical cross-sectional shape of a peripheral wall forming an opening of the discharge port member is formed so that a wall surface of any one of or both an interior or an outside of the discharge port member inclines toward an tip end of the opening to reduce a wall thickness.

The cross-sectional shape of the peripheral wall at the opening of the discharge port member is formed so that the wall thickness is reduced toward the tip end of the opening; accordingly, it is easy to form and possible to manufacture at a low cost.

In the compressed air jet device of the present invention, the discharge port member is preferably formed so that a surface presents a mirror surface.

Since it is the mirror surface, a stain is not easily adhered; and even if it is adhered, it can be easily peeled off.

In the compressed air jet device, the peripheral wall of the discharge port member preferably have a recess thinning a wall thickness by forming a part of an inner surface to be a concave shape.

Since material cost can be small by the recess, it is possible to manufacture with lower cost and attain light weighting.

In this case, it is preferable that a plurality of the recesses be formed at intervals in the circumferential direction of the peripheral wall and a rib be formed between the recesses along a longitudinal direction of the peripheral wall.

Dividing the vicinity of the inner surface of the peripheral wall by the rib, the compressed air is not biased in a part of the circumferential direction and discharged evenly in the circumferential direction of the discharge port member.

In the compressed air jet device of the present invention, it is preferable that the connection connected to the pipe be made of metal and others be made of synthetic resin in the discharge port member.

It is possible to install the discharge port member rigidly to the pipe by the connection made of metal.

Advantageous Effects of Invention

The compressed air jet device according to the present invention is easy to form and can manufacture at low cost; and by forming in the mirror surface, a stain is not easily adhered and easily peeled off even if it is adhered; moreover, the ejection of the compressed air can be more even.

DESCRIPTION OF EMBODIMENTS

The present invention will be explained below based on the attached drawings. A compressed air jet device A according to the present invention is configured from a pipe P communicated with a compressed air supply source and a plurality of discharge port members 1 provided on the pipe P. A connection 10 is integrally provided with the discharge port member 1; and the connection 10 is installed on the pipe P. Here, components which are the same in a compressed air jet device explained by FIG. 3 to FIG. 6 are explained using the same symbols.

Figure 1:
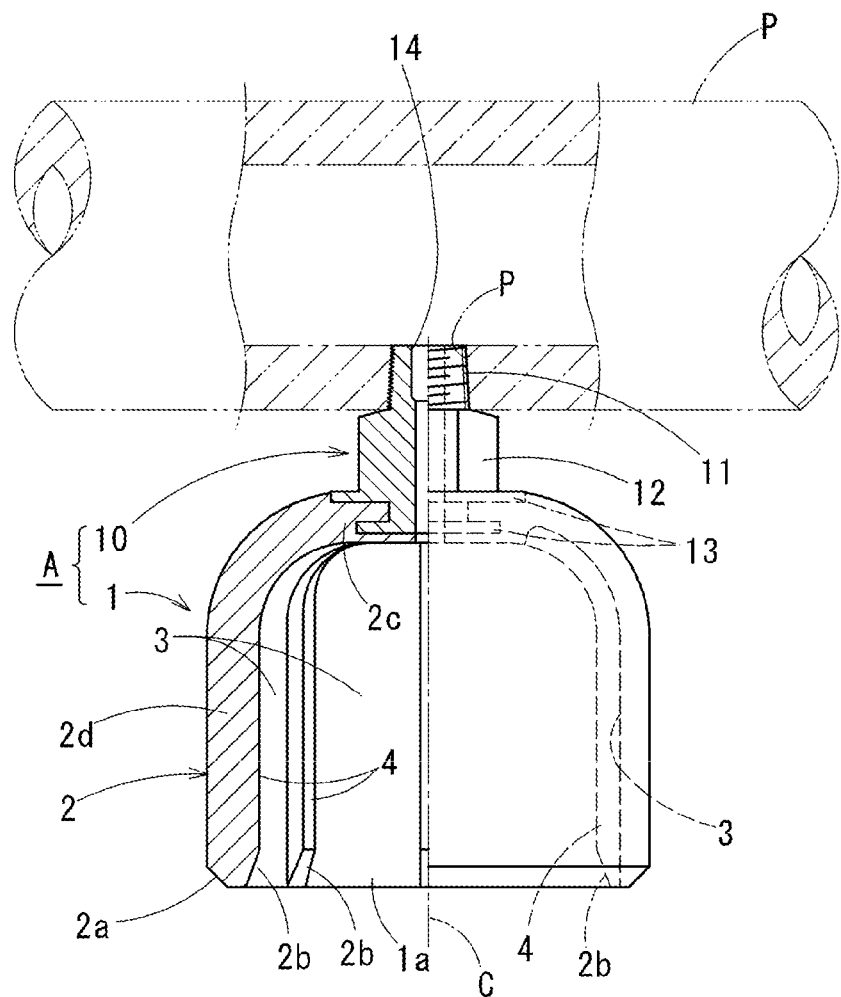
FIG. 1 It is a frontal view showing a compressed air jet device according to one embodiment of the present invention with a left half in section.

FIG. 1 shows a state in which the discharge port member 1 is installed on the pipe P to hang down. That is, it shows a state that the discharge port member 1 hangs and installed on the pipe P via the connection 10.

Figure 3:
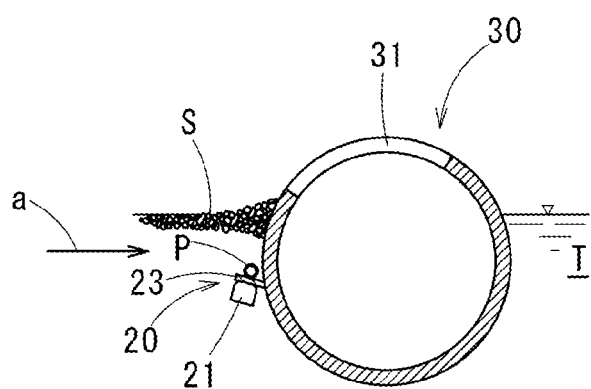
FIG. 3 It is a pipe skimmer at which a conventional compressed air jet device is provided, and a state in which the compressed air jet device does not jet the compressed air is shown.
Figure 4:
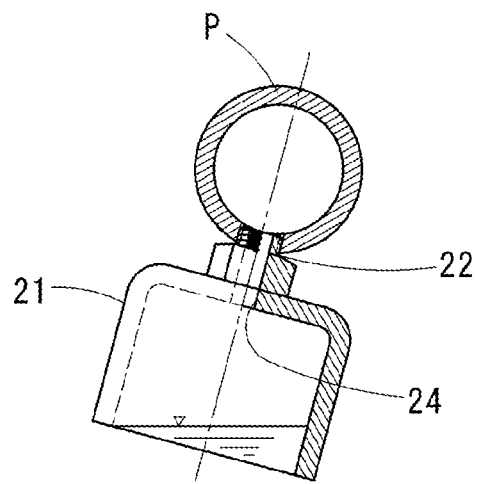
FIG. 4 It is an enlarged view of a part of the compressed air jet device in FIG. 3.
Figure 5:
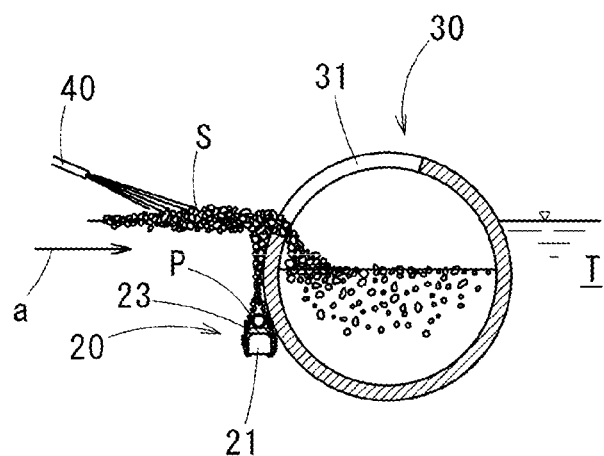
FIG. 5 It is a pipe skimmer at which a conventional compressed air jet device is provided, and a state in which the compressed air jet device jets the compressed air is shown.
Figure 6:
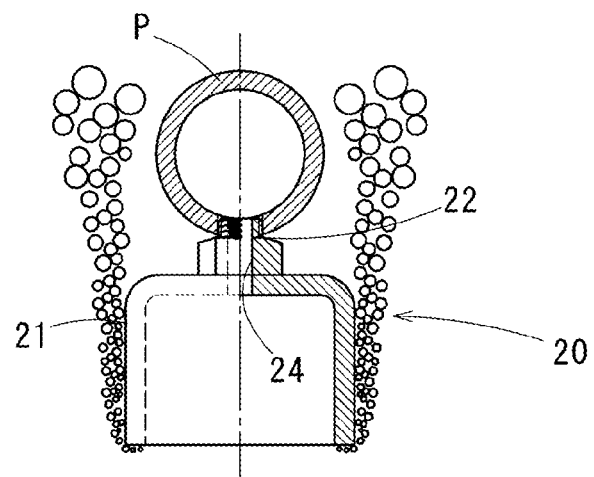
FIG. 6 It is an enlarged view of a part of the compressed air jet device in FIG. 5.

The pipe P is made of metal made of SUS or the like, and as shown in the above-described FIG. 3 and FIG. 5, when the compressed air jet device A is installed in a pipe skimmer of a scum removal device of a primary sedimentation basin, the pipe P is attached to the pipe skimmer via a supporting member (refer to a symbol 23 in FIG. 3 and FIG. 5). In a case in which the scum removal device of the primary sedimentation basin is a trough-type scum discharge mechanism shown in FIG. 7 and FIG. 8 in the above-described Patent Literature 2, the compressed air jet device A is attached to the trough.

In addition, in a case in which the discharge port member 1 is installed on a side wall in the vicinity of the scum removal device (pipe skimmer) of the primary sedimentation basin, the pipe P is attached to the side wall. Alternatively, in a case in which the discharge port member 1 is installed on a side wall in the vicinity of a scum pit of a sewer of the primary sedimentation basin, the pipe P is attached to the side wall.

In FIG. 1, only one discharge port member 1 appears on the pipe P; however, in actual equipment, number of the discharge port members 1 are attached at predetermined intervals to each other along a longitudinal direction of the pipe P facing the same direction.

A screw hole P' is formed on the pipe P. The screw hole P' is formed to screw a thread portion 11 of the connection 10 described later, and a depth of the screw hole P', i.e., a thickness of the pipe P is decided to rigidly fix the connection 10 when the thread portion 11 of the connection 10 is screwed in. An inner diameter of the pipe P is decided so as to supply sufficient compressed air to the discharge port members 1 provided and hang on the pipe P.

The discharge port member 1 is made of synthetic resin such as fluororesin, and its outer shape is formed in a cup shape (cup shape, bell shape, etc.) having an opening 1a in a lower part thereof. Particularly, if the discharge port member 1 is a formed product of fluororesin, since the surface is the mirror surface, it is possible to obtain effects that a stain is not easily adhered even if it is located in waste water, or it can be easily peeled off if it is adhered. In addition, other methods can be adopted as a method of mirror-finishing the surface of the discharge port member 1. For example, the surface of the discharge port member 1 can be subjected to deposition treatment with ceramics.

A peripheral wall 2 forming the opening 1a of the discharge port member 1 is formed so that a cylindrical portion 2d continuing to a top portion 2c is formed in a cylindrical shape; an outer surface and an inner surface of the cylindrical portion 2d are formed inclining so as to reduce the wall thickness downward (toward the tip) in a cross-sectional surface through an axis C. That is, the outer side of the peripheral wall 2 is provided with an outer notch 2a to incline in a direction to reduce the outer diameter of the discharge port member 1 toward the lower side; and the inner side of the peripheral wall 2 is provided with an inner notch 2b to incline in a direction to increase the inner diameter of the discharge port member 1 toward the lower side. By these outer notch 2a and the inner notch 2b, both the inner surface and the outer surface of the peripheral wall 2 near the opening 1a are inclined surfaces.

As described above, by reducing the cross-section of the peripheral wall 2 of the discharging member 1 toward the lower side, it is easy to form synthetic resin and attempt to reduce production cost. Moreover, the cross-section of the peripheral wall 2 of the discharge port member 1 is smaller as it goes downward, so that the tip end thickness of the peripheral wall 2 is small; and the discharge of the compressed air via the tip end of the peripheral wall 2 from the opening 1a can be more even. In addition, in the illustrated example, the outer notch 2a and the inner notch 2b are both provided; however, only one of the notches may be an inclined surface. Also in this case, the above-described effect can be obtained.

Figure 2:
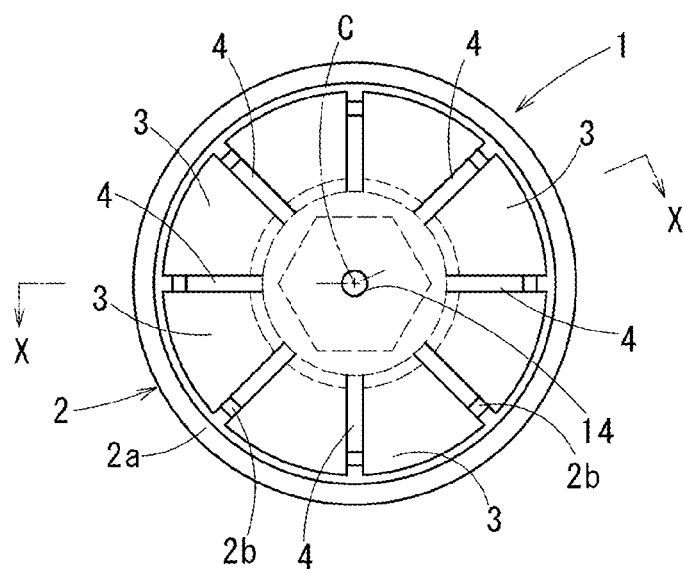
FIG. 2 It is a bottom view of the compressed air jet device; the cross-section along the line X-X of FIG. 2 corresponds to FIG. 1.

A recess portion 3 is formed reducing the wall thickness of the discharge port member 1 on a part of the inner surface of the peripheral wall 2 of the discharge port member 1. The recess portion 3 can be easily formed without special cut working only by providing a protruded portion corresponding to the recess portion 3 on a die. Providing the recess portion 3 on the discharge port member 1, the production cost can be small, it can be produced more inexpensively, and it is possible to attempt to reduce the weight. In this case, the recess portion 3 is provided on the cylindrical portion 2d of the peripheral wall 2 other than the top portion 2c of the discharge port member 1 and formed to be continuous to the tip end of the opening 1a. A plurality of the recess portions 3 are formed at intervals in the circumferential direction; between the recess portions 3, ribs 4 are formed to the tip along the longitudinal direction of the discharge port member 1. The ribs 4 are formed in a narrow plate shape protruding inward in a radial direction of the cylindrical portion 2d of the peripheral wall 2 between the adjacent recess portions 3. As shown in FIG. 2, when viewed from the side of the opening 1a, the ribs 4 are arranged toward the axis C. In the illustrated example, the inner notch 2b is formed at the lower end part of the ribs 4.

In the vicinity of the inner peripheral part of the peripheral wall 2 of the discharge port member 1, the compressed air flows in the plurality of the recess portions 3 and separated by the ribs 4, so that the compressed air is not biased in a part of the circumferential direction and discharged evenly in the circumferential direction of the discharge port member 1.

The connection 10 is made of metal such as SUS, and has the thread portion 11, a tool engaging portion 12, flange portions 13, and a hole portion 14. The thread portion 11, the tool engaging portion 12 and the flange portions 13 are configured integrally continuous on the axis C; the hole portion 14 is formed to penetrate on a position of the axis C of the integrated object by a boring machining of several mm of diameter in a penetrating state. By the hole portion 14, when the discharge port member 1 is installed on the pipe P, the inside of the discharge port member 1 and the inside of the pipe P are maintained in a communicated state.

The thread portion 11 is formed to be engaged to the screw hole P' provided on the pipe P; the tool engaging portion 12 is formed below the thread portion 11 so that the circumference has a hexagonal lateral cross-section shape. The flange portions 13 are formed two to be vertically separated below the tool engaging portion 12. The tool engaging portion 12 is an object to which a tool is equipped when the discharge port member 1 is threaded into the screw hole P' of the pipe P; the flange portions 13 are used as a connection to the discharge port member 1 by insert molding when the discharge port member 1 is resin-molded.

Next, an example of manufacturing the discharge port member 1: first, the connection 10 is set in a mold of a resin-molding machine, and then injection molding is performed. If the hole portion 14 is formed in the connection 10 in advance, it is confirmed that the hole is not closed by the molded resin; if it is closed, hole drilling is performed. When the hole portion 14 of the connection 10 is formed after molding, machining of the hole portion 14 is performed on the molded object.

The jet operation of the compressed air when the compressed air jet device A having the above-described structure is provided at the scum removal device of the primary sedimentation basin in the sewage treatment plant is omitted so as to avoid repetition since it has been explained in the paragraphs of Background Art using FIG. 3 to FIG. 6.

When the discharge port member 1 is disposed on the side wall in the vicinity of the scum removal device of the primary sedimentation basin, or when it is disposed on the side wall in the vicinity of the scum pit of the sewer of the primary sedimentation basin, the scum adhered to the side wall is peeled off by the bubbles discharged from the discharge port member 1, so that the scum smoothly moves and the scum removal is performed with efficiency.

One embodiment of the present invention has been explained based on the drawings: the specific configuration is not limited to the above-described embodiment and various modifications may be made without departing from the scope of the present invention.

The compressed air jet device according to the present invention is used not only in the sewage treatment plant, but it is applicable also in a water tank where scum is generated in a treatment facility of sewage such as various industrial liquid waste. Moreover, it can be applied when floating and separating valuables in a food plant, a chemical plant, and the like.

In the example shown in FIG. 1 and FIG. 2, in the vicinity of the opening 1a of the discharge port member 1, the notch 2b is formed on the end portion of the ribs 4; however, an inclined surface may be made to reduce the wall thickness of the cylindrical portion 2d of the peripheral wall 2 by forming notches on the lower end of the recess portions 3.

INDUSTRIAL APPLICABILITY

The compressed air jet device can be appropriately used in a location such as the sedimentation basin of the sewage treatment plant and the like for treating wastewater and waste liquid; a stain is not easily adhered and can be easily peeled off if it is adhered, and the compressed air can more evenly jet out.

REFERENCE SIGNS LIST

A Compressed air jet device
1 Discharge port member
1a Opening
2 Peripheral wall
2a Outer notch
2b Inner notch
2c Top portion
2d Cylindrical portion
3 Recess portion
4 Rib
5 Connection
11 Thread portion
12 Tool engaging portion
13 Flange portion
14 Hole portion
P Pipe
P' Screw hole

The invention claimed is:

1. A compressed air jet device comprising a pipe communicated with a supply source of compressed air and an discharge port member provided on the pipe, wherein the discharge port member is formed in a cup shape in which a top part thereof is connected to the pipe and an opening faces outward in a radius direction of the pipe, and on a connection of the pipe and the discharge port member, a hole portion is formed to communicate an interior of the pipe and an interior of the discharge port member; the compressed air jet device wherein a vertical cross-sectional shape of a peripheral wall forming an opening of the discharge port member is formed so that a wall surface of any one of or both an interior or an outside of the discharge port member inclines toward an tip end of the opening to reduce a wall thickness; and wherein a plurality of the recesses are formed at intervals in a circumferential direction of the peripheral wall, and a rib is formed between the recesses along a longitudinal direction of the peripheral wall.

2. The compressed air jet device according to claim 1, wherein the discharge port member is formed so that a surface presents a mirror surface.

3. The compressed air jet device according to claim 1, wherein the peripheral wall of the discharge port member has a recess thinning a wall thickness by forming a part of an inner surface to be a concave shape.

4. The compressed air jet device according to claim 1, wherein the connection connected to the pipe is made of metal and others are made of synthetic resin in the discharge port member.

5. The compressed air jet device according to claim 2, wherein the peripheral wall of the discharge port member has a recess thinning a wall thickness by forming a part of an inner surface to be a concave shape.

6. The compressed air jet device according to claim 5, wherein a plurality of the recesses are formed at intervals in a circumferential direction of the peripheral wall, and a rib is formed between the recesses along a longitudinal direction of the peripheral wall.

7. The compressed air jet device according to claim 6, wherein the connection connected to the pipe is made of metal and others are made of synthetic resin in the discharge port member.

8. The compressed air jet device according to claim 3, wherein the connection connected to the pipe is made of metal and others are made of synthetic resin in the discharge port member.

* * * * *